J. G. & J. H. STOKESBARY.
CORN-PLANTER.

No. 186,766. Patented Jan. 30, 1877.

WITNESSES:
E. Wolff
Alex. T. Roberts

INVENTOR:
J. G. Stokesbary
J. H. Stokesbary
BY Munn & Co.
ATTORNEYS.

UNITED STATES PATENT OFFICE.

JESSE G. STOKESBARY AND JOHN H. STOKESBARY, OF MILLERSBURG, IOWA.

IMPROVEMENT IN CORN-PLANTERS.

Specification forming part of Letters Patent No. 186,766, dated January 30, 1877; application filed October 30, 1876.

*To all whom it may concern:*

Figure 1:
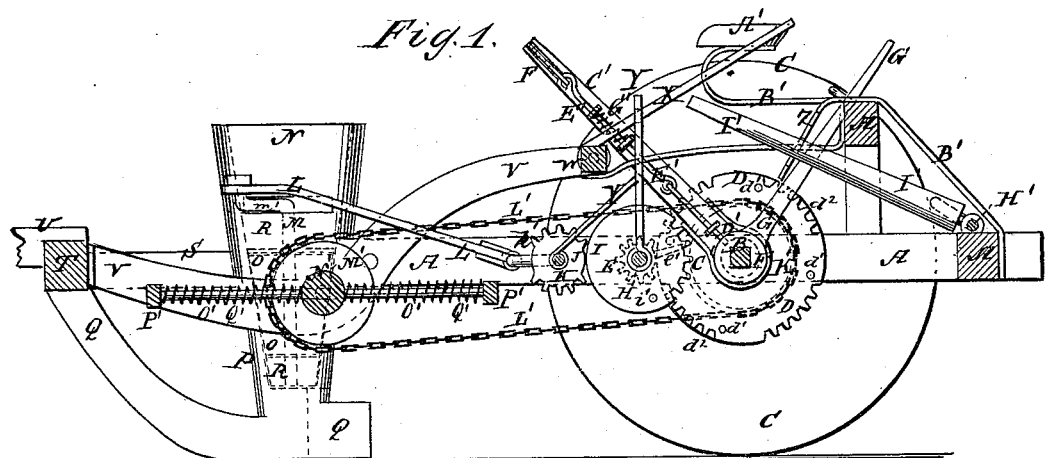
Figure 2:
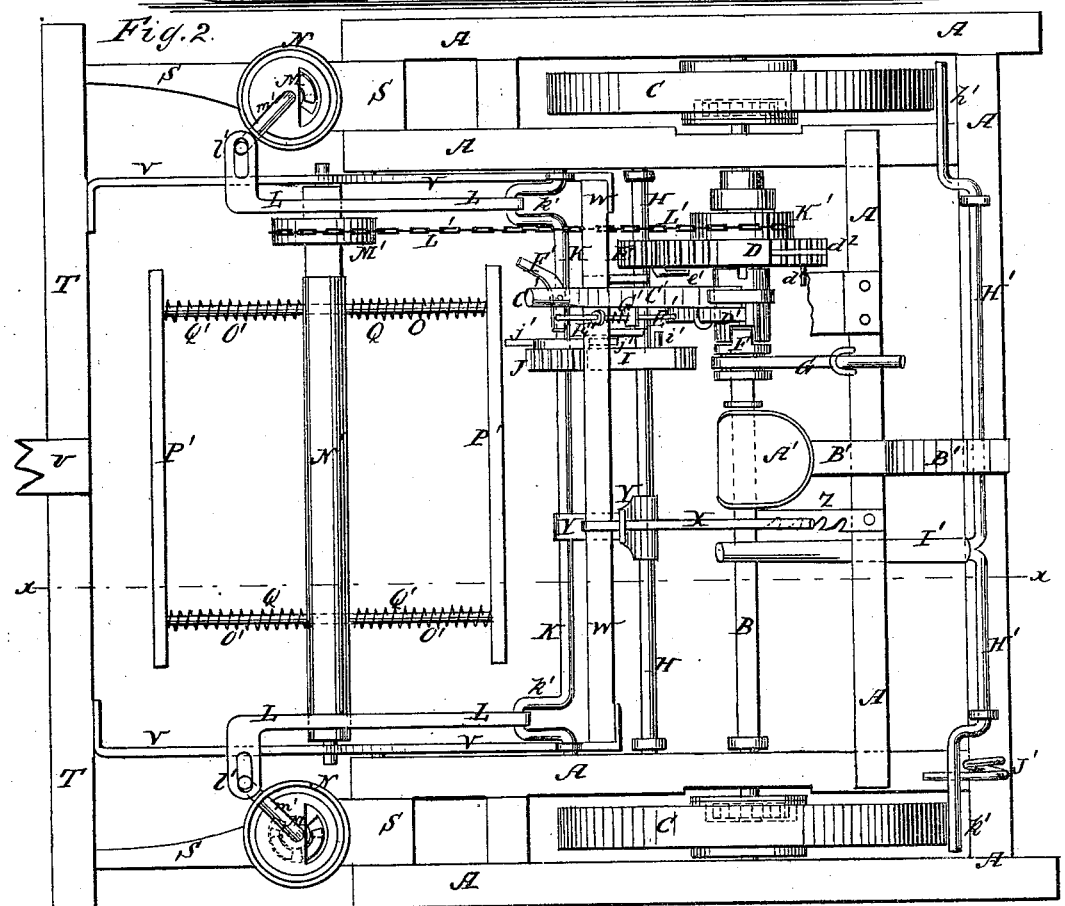
Figure 3:
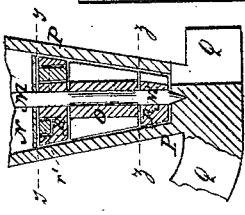
Figure 4:
Figure 5:

Be it known that we, JESSE G. STOKESBARY and JOHN H. STOKESBARY, of Millersburg, in the county of Iowa, and State of Iowa, have invented a new and useful Improvement in Self-Dropping Corn-Planter, of which the following is a specification:

Figure 1 is a vertical longitudinal section of our improved machine, taken through the line $x\ x$, Fig. 2. Fig. 2 is a top view of the same, part being broken away to show the construction. Fig. 3 is a longitudinal section of the seed-dropping device. Fig. 4 is a cross-section of the same, taken through the line $y\ y$, Fig. 3. Fig. 5 is a cross-section of the same, taken through the line $z\ z$, Fig. 3.

Similar letters of reference indicate corresponding parts.

The object of this invention is to furnish an improved corn-planter, which shall be so constructed as to drop the seed automatically as the machine is drawn forward, which shall be easily controlled, and will enable the hills to be planted in accurate check-row, and which at the same time shall be simple in construction, and reliable in operation.

The invention will first be described in connection with the drawing, and then pointed out in the claims.

A is the frame of the machine, in bearings in the side bars of which revolves the axle B.

Upon the end parts of the axle B are placed the wheels C, which are connected with said axle B by pawls and ratchets, so that the said wheels may carry the said axle with them in their forward movement, but may be turned back without turning the axle.

The wheels C are made of such a size as to be seven feet four inches in circumference. Upon the axle B is placed a large segmental gear-wheel, D, the toothed sections of which are equally distant from each other, and each section contains so many teeth as to carry the small gear-wheel E, into which they mesh, through an entire revolution.

In the inner end of the hub of the wheel D are formed teeth to receive the teeth of the clutch F, that slides longitudinally upon the axle B, and in which is formed a ring-groove to receive the forked end of the lever G, by which the machine is thrown into and out of gear. The lever G is pivoted to a bar of the frame A, in such a position that it may be readily reached and operated by the driver from his seat.

In one side of the small gear-wheel E, enough teeth are cut away to allow the gear-wheel D to revolve without turning the said gear-wheel E. To one side of the gear-wheel E is rigidly attached or upon it is formed a finger, $e'$, against which strike pins $d'$, attached to the side of the gear-wheel D, a little in front of the toothed sections, to turn the gear-wheel E enough to insure the meshing of the first tooth of the sections of the wheel D with the first tooth of the wheel E.

As thus described, the machine will plant the hills twenty-two inches apart. To cause the machine to plant the hills forty-four inches apart, the alternate pins $d^1$ are removed, and a strip, $d^2$, is inserted in a groove formed in the face of the wheel D, across the teeth of the alternate sections, as shown in Figs. 1 and 2, so as to prevent said teeth from meshing with the teeth of the wheel E.

The small gear-wheel E is rigidly attached to a shaft, H, which revolves in bearings attached to the inner side bars of the frame A, and to which is attached a larger wheel, I. In one side of the wheel I is formed a short section of teeth, which, at each revolution of the said wheel I, mesh into the teeth of one or the other of the two segments of the segmetal gear-wheel J. The wheel J is attached to the shaft K, which revolves in bearings in the frame A.

To the segmental wheel J are attached two fingers, $j'$, which project in opposite directions, so as to be struck alternately by a pin, $i'$, attached to the side of the gear-wheel I to throw the first tooth of the said wheel I into gear with the first tooth of the segments of the wheel J.

In the shaft K, near its ends, are formed two cranks, $k'$, which project upon the same side of the shaft, and to which are pivoted the rear ends of the connecting-bars L. Upon the forward ends of the bars L are formed short arms $l'$, projecting at right angles, and which are slotted longitudinally to receive the cranks $m'$, formed upon the upper ends of the shaft M, which passes down through the bottom of the seed-hoppers N, and through the block O secured in the spout P, that leads from the seed-hopper N to the forked rear end of the runners Q, by which the furrows are opened to receive the seed.

To the shaft M, above and below the block O, are attached two dropping-blocks, R, in each of which are formed two holes of such a size as to contain enough seed for a hill. The holes of the upper block R receive seed alternately through a hole in the bottom of the seed-box N, and, as they are turned by the crank-shaft M drop the seed through holes in the block O into the holes in the lower dropping-block R, by which it is dropped to the ground at the next movement of the shaft M.

The holes in the upper dropping-block R have grooves connected with them, in which are placed small sliding blocks $r'$, to enable the size of said holes to be adjusted according to the amount of seed to be dropped. The spout P and the hopper N are formed upon or attached to the raves S of the runners Q. The rear ends of the raves S are pivoted or hinged to the forward ends of the side bars of the frame A, so that the said runners may be raised from the ground or made to work at any desired depth in the ground. The forward ends of the runners Q are connected by a cross-bar, T, to which the tongue U is attached. To the end parts of the cross-bar T are attached the forward ends of two levers, V, which are pivoted to the inner sides of the forward ends of the inner side bars of the frame A. The rear parts of the levers V are curved upward and rearward, and their rear ends are connected by a cross-bar, W, so that the driver, by pressing down with his feet upon the cross-bar W, can force the runners Q into the ground in planting in a hard soil. To the cross-bar W is attached the end of a lever, X, which passes through and has its fulcrum in a standard, Y, attached to and supported by the shafts H K. By forcing down the rear end of the lever X, which the driver can do with his foot, the runners Q will be raised from the ground. The rear end of the lever X, when forced down, moves along a toothed or notched bar, Z, and may be held in any desired position by catching it upon a tooth of said bar Z.

$A'$ is the driver's seat, the standard $B'$ of which is attached to the rear cross-bars of the frame A. $C'$ is a lever, the lower end of which rests upon the hub of the gear-wheel D, and is connected with said hub by a strap passing around it. In guides attached to the side of the lever $C'$ works a pawl, $D'$, which, when forced down, engages with notches or teeth formed in the hub of the gear-wheel D. To the upper end of the pawl $D'$ is pivoted the lower end of the connecting-rod $E'$, the upper end of which is pivoted to the end of a bent lever, $F'$. The lever $F'$ is pivoted at its angle to the upper part of the lever $C'$. The pawl $D'$ is held up from the hub of the gear-wheel D by a spiral spring, $G'$, coiled around the connecting-rod $E'$.

By this construction, by pressing down the pawl $D'$ and operating the lever $C'$, the gear-wheel D may be turned to adjust the machine to drop the seed in line with the cross-rows of the previous hills, in starting in at the side of the field, and in case the cross-rows should be getting out of line from any cause.

To the rear part of the frame A is pivoted a cross-rod, $H'$, upon the ends of which are formed, or to them are attached, cranks $h'$. The cranks $h'$ project across the rims of the wheels C, so that by turning the rod $H'$ the said cranks $h'$ may be pressed against the said wheels C, to scrape off any mud that may adhere to them. The rod $H'$ is turned by a lever, $I'$, attached to it, and which projects forward into such a position that it may be conveniently reached and operated by the driver with his foot. The rod $H'$ is turned back to raise the cranks $h'$ from the wheels C by a spring or springs, $J'$, attached to the frame A, and which press against the said cranks $h'$.

To the axle B is attached a chain-wheel, $K'$, around which passes an endless chain, $L'$. The chain $L'$ also passes around a chain-wheel, $M'$, attached to the shaft $N'$, the ends of which are pivoted to the levers V, a little in front of their pivots, so that the shaft $N'$ and its attachments may be raised at the same time as the runners Q, and by the same operation.

In the shaft $N'$, toward its ends, are formed two holes, through which pass the middle parts of the cross-arms $O'$, to the outer ends of which are attached two bars, $P'$. Around the cross-arms $O'$, upon both sides of the shaft $N'$, are coiled spiral springs $Q'$, the inner ends of which rest against the said shaft $N'$, and their outer ends rest against the bars $P'$. The chain-wheels $K'$ $M'$ are so arranged that as the hills are dropped one of the bars $P'$ may come to the ground in line with said hills, and thus mark the cross-rows, the springs $Q'$ being made of such a strength as to hold the bars P against the ground to mark it, but to allow the arms $O'$ to slide through the shaft $N'$, should the bars $P'$ strike upon hard ground or other obstruction, and thus prevent breakage.

Having thus described our invention, we claim as new and desire to secure by Letters Patent—

1. In mechanism for operating the droppers of a planter, the combination of spur-wheels D E, the former having each section of its teeth equal to those of the latter in number, while the wheel E is cut away on one side, and has a finger, $e'$, that strikes a pin of wheel D, as and for the purpose described.

2. The strip $d^2$, arranged in the grooved face and across the alternate cogged sections of wheel D, as and for the purpose set forth.

3. The combination of chain-wheels K' M', endless chain L', shaft N', sliding cross-arms O', marking-bars P', and spiral springs Q', with the axle, frame, and levers V, substantially as and for the purpose specified.

4. The combination, with the shaft N', of the slides O', bars P', and coiled springs Q', as and for the purpose specified.

JESSE G. STOKESBARY.
JOHN H. STOKESBARY.

Witnesses:
E. J. BAIRD,
J. K. YOUNG.